United States Patent
Iwai et al.

(10) Patent No.: US 11,191,030 B2
(45) Date of Patent: Nov. 30, 2021

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Takashi Iwai, Ishikawa (JP);
Tomohumi Takata, Ishikawa (JP);
Shotaro Maki, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/643,760

(22) PCT Filed: Aug. 22, 2018

(86) PCT No.: PCT/JP2018/030936
§ 371 (c)(1),
(2) Date: Mar. 2, 2020

(87) PCT Pub. No.: WO2019/069571
PCT Pub. Date: Apr. 11, 2019

(65) Prior Publication Data
US 2020/0280925 A1 Sep. 3, 2020

(30) Foreign Application Priority Data
Oct. 6, 2017 (JP) .............................. JP2017-195998

(51) Int. Cl.
*H04W 52/08* (2009.01)
*H04W 52/14* (2009.01)
(Continued)

(52) U.S. Cl.
CPC ......... *H04W 52/146* (2013.01); *H04L 5/0007* (2013.01); *H04W 16/28* (2013.01);
(Continued)

(58) Field of Classification Search
CPC . H04W 52/146; H04W 52/08; H04W 52/242; H04W 52/10; H04W 52/38;
(Continued)

(56) References Cited

U.S. PATENT DOCUMENTS

2012/0087334 A1\* 4/2012 Suzuki ................. H04L 5/0091
370/329
2015/0124673 A1 5/2015 Ouchi et al.
2019/0190747 A1\* 6/2019 Park ...................... H04L 5/0057

FOREIGN PATENT DOCUMENTS

JP 2013-236287 11/2013

OTHER PUBLICATIONS

International Search Report of PCT application No. PCT/JP2018/030936 dated Oct. 23, 2018.
(Continued)

*Primary Examiner* — Tu X Nguyen
(74) *Attorney, Agent, or Firm* — Seed IP Law Group LLP

(57) ABSTRACT

In a terminal, a transmission power control unit controls the transmission power of an uplink channel (the PUSCH) by using transmission power control information (a TPC command) indicating one from among a plurality of candidate values. A wireless transmission unit transmits the uplink channel with the above transmission power. Instruction information for resetting a control value (closed loop correction value) to be used in a closed loop control of the transmission power is associated with at least one value among the above plurality of candidate values.

8 Claims, 13 Drawing Sheets

| TPC COMMAND INFORMATION [2 BITS] | ACCUMULATED MODE $\delta_{PUSCH,c}$ [dB] | ABSOLUTE MODE $\delta_{PUSCH,c}$ [dB] |
|---|---|---|
| 0 | -1 | -4 |
| 1 | 0 | -1 |
| 2 | 1 | 1 |
| 3 | 3 | 4 |

(51) Int. Cl.
  *H04L 5/00* (2006.01)
  *H04W 16/28* (2009.01)
  *H04W 52/22* (2009.01)
  *H04W 72/04* (2009.01)

(52) U.S. Cl.
  CPC .......... *H04W 52/08* (2013.01); *H04W 52/22* (2013.01); *H04W 72/0473* (2013.01)

(58) Field of Classification Search
  CPC ... H04W 16/28; H04W 52/221; H04W 52/36; H04W 72/046; H04W 52/362; H04W 52/58; H04W 52/04; H04W 52/143; H04W 52/228; H04W 40/08; H04W 40/10; H04W 52/18; H04W 52/226; H04W 52/06; H04W 52/12; H04W 52/32; H04W 52/545; H04W 52/367; H04B 7/0695; H04B 7/0617; H04B 7/0413
  See application file for complete search history.

(56) References Cited

OTHER PUBLICATIONS

R1-1716763, 3GPP TSG RAN WG1 NR Ad-Hoc Meeting, "WF on power control framework", Sep. 2017.
3GPP TS 36.213 version14.3.0 Release 14, "LTE; Evolved Universal Terrestrial Radio Access (E-UTRA); Physical layer procedures", Jun. 2017.
3GPP TSG RAN WG1 Meeting NR#3, "RAN1 Chairman's Notes", Sep. 2017.
R4-1707512, "CDF requirements for mmWave UEs", 3GPP TSG-RAN WG4 Meeting #84, Aug. 2017.

* cited by examiner

FIG. 1

| TPC COMMAND INFORMATION [2 BITS] | ACCUMULATED MODE $\delta_{PUSCH,c}$ [dB] | ABSOLUTE MODE $\delta_{PUSCH,c}$ [dB] |
| --- | --- | --- |
| 0 | -1 | -4 |
| 1 | 0 | -1 |
| 2 | 1 | 1 |
| 3 | 3 | 4 |

FIG. 2

| CLOSED LOOP CORRECTION VALUE RESET INFORMATION [1 BIT] | RESET FLAG |
| --- | --- |
| 0 | RESET |
| 1 | NOT RESET |

FIG. 8

| TPC COMMAND INFORMATION [2 BITS] | ACCUMULATED MODE $\delta_{PUSCH,c}$ [dB] |
|---|---|
| 0 | -1 |
| 1 | RESET |
| 2 | 1 |
| 3 | 3 |

FIG. 9

| TPC COMMAND INFORMATION [3 BITS] | ACCUMULATED MODE $\delta_{PUSCH,c}$ [dB] |
|---|---|
| 0 | RESET |
| 1 | -5 |
| 2 | -3 |
| 3 | -1 |
| 4 | 0 |
| 5 | 1 |
| 6 | 3 |
| 7 | 5 |

FIG. 10

| TPC COMMAND INFORMATION [3 BITS] | TPC COMMAND MODE | $\delta_{PUSCH,c}$ [dB] |
|---|---|---|
| 0 | ABSOLUTE MODE | -1 |
| 1 | | 0 (=RESET) |
| 2 | | 1 |
| 3 | ACCUMULATED MODE | -3 |
| 4 | | -1 |
| 5 | | 0 |
| 6 | | 1 |
| 7 | | 3 |

| TPC COMMAND INFORMATION [3 BITS] | ACCUMULATED MODE $\delta_{PUSCH,c}$ [dB] |
|---|---|
| 0 | RESET |
| 1 | -7 |
| 2 | -5 |
| 3 | -3 |
| 4 | 0 |
| 5 | 3 |
| 6 | 5 |
| 7 | 7 |

FIG. 17

| TPC COMMAND INFORMATION [3 BITS] | ACCUMULATED MODE $\delta_{PUSCH,c}$ [dB] |
|---|---|
| 0 | RESET |
| 1 | -6 |
| 2 | -3 |
| 3 | -1 |
| 4 | 0 |
| 5 | 1 |
| 6 | 3 |
| 7 | 6 |

FIG. 18

| TPC COMMAND INFORMATION [3 BITS] | ACCUMULATED MODE $\delta_{PUSCH,c}$ [dB] |
|---|---|
| 0 | RESET |
| 1 | -3 |
| 2 | -2 |
| 3 | -1 |
| 4 | 0 |
| 5 | 1 |
| 6 | 2 |
| 7 | 3 |

TERMINAL, BASE STATION, TRANSMISSION METHOD, AND RECEPTION METHOD

TECHNICAL FIELD

The present disclosure relates to a terminal, a base station, a transmission method, and a reception method.

BACKGROUND ART

In the standardization of 5G, a new radio access technology (New Radio (NR)) that is not necessarily backwards-compatible with LTE/LTE-Advanced is being discussed by the 3GPP.

In the discussion of the transmission power control (TPC) method for NR terminals (also referred to as user equipment UE)), a function extension accounting for the transmission and reception of beams for NR (directional transmission and reception) based on the LTE transmission power control method (see NPL 1, for example) is under consideration.

CITATION LIST

Non Patent Literature

NPL 1: 3GPP TS 36.213 V14.3.0, "Physical layer procedures (Release 14)" (2017-06)
NPL 2: 3GPP TSG RAN WG1 Meeting #3, RAN1 Chairman's Notes, September 2017
NPL 3: R4-1707512, "CDF requirements for mmWave UEs", NTT DOCOMO, August 2017

SUMMARY OF INVENTION

Technical Problem

However, methods of transmission power control in NR have not been considered fully.

An embodiment of the present disclosure facilitates providing a terminal and a communication method capable of performing transmission power control appropriately.

Solution to Problem

A terminal according to one embodiment of the present disclosure is provided with a circuit that controls a transmission power of an uplink channel by using transmission power control information indicating one value from among a plurality of candidate values, and a transmitter that transmits the uplink channel with the transmission power, in which instruction information for resetting a control value to use in a closed loop control of the transmission power is associated with at least one value among the plurality of candidate values.

A base station according to one embodiment of the present disclosure is provided with a circuit that generates transmission power control information indicating one value from among a plurality of candidate values used to control a transmission power of an uplink channel, and a receiver that receives the uplink channel transmitted with the transmission power, in which instruction information for resetting a control value to use in a closed loop control of the transmission power is associated with at least one value among the plurality of candidate values.

A transmission method according to one embodiment of the present disclosure includes controlling a transmission power of an uplink channel by using transmission power control information indicating one value from among a plurality of candidate values, and transmitting the uplink channel with the transmission power, in which instruction information for resetting a control value to use in a closed loop control of the transmission power is associated with at least one value among the plurality of candidate values.

A reception method according to one embodiment of the present disclosure includes generating transmission power control information indicating one value from among a plurality of candidate values used to control a transmission power of an uplink channel, and receiving the uplink channel transmitted with the transmission power, in which instruction information for resetting a control value to use in a closed loop control of the transmission power is associated with at least one value among the plurality of candidate values.

It should be noted that general or specific embodiments may be implemented as a system, an apparatus, a method, an integrated circuit, a computer program, a storage medium, or any selective combination thereof.

Advantageous Effects of Invention

According to an embodiment of the present disclosure, it is possible to perform transmission power control appropriately.

Additional benefits and advantages according to an embodiment of the present disclosure will become apparent from the specification and the drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates one example of a TPC command table.
FIG. 2 illustrates one example of closed loop correction value reset information.
FIG. 8 illustrates one example of the TPC command table according to Setting Example 1 of Embodiment 1.
FIG. 9 illustrates one example of the TPC command table according to Setting Example 2 of Embodiment 1.
FIG. 10 illustrates one example of the TPC command table according to Embodiment 2.

FIG. 17 illustrates one example of the TPC command table according to Embodiment 4.

FIG. 18 illustrates one example of the TPC command table according to Embodiment 4.

DESCRIPTION OF EMBODIMENTS

Figure 3:
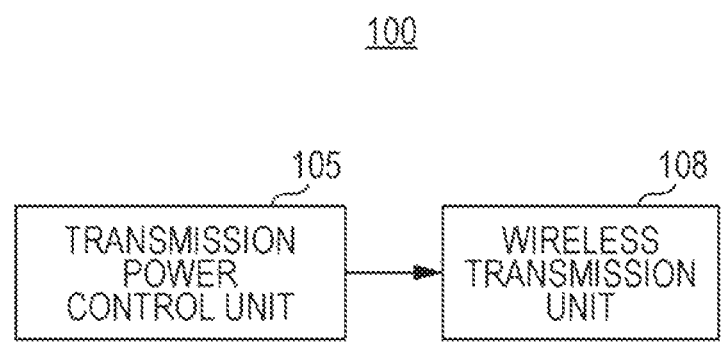
FIG. 3 illustrates a configuration of part of a terminal according to Embodiment 1.

Hereinafter, exemplary embodiments of the present disclosure will be described in detail and with reference to the drawings.

In LTE, a terminal performs transmission power control on the uplink channel of each component carrier (CC). Formula (1) expresses a definitional equation of the transmission power of the physical uplink shared channel (PUSCH) used in LTE (see NPL 1, for example).

$$P_{pusch}(i) = \min\{Pc \quad \max(i), 10 \quad \log \quad 10(M_{pusch}(i)) + P_{o\_pusch} + \alpha \cdot PL + \Delta_{TF}(i) + f_c(i)\} \quad (1)$$

In Formula (1), i represents a subframe number (or slot number), $P_{PUSCH}(i)$ represents the transmission power of the PUSCH for the subframe number i, Pcmax(i) represents the maximum transmission power [dBm] of the terminal for the subframe number i, $M_{pusch}(i)$ represents the transmission bandwidth [PRB] of the PUSCH for the subframe number i, $P_{o\_pusch}$ represents a parameter value [dBm] preset from the base station (also called the "eNB" or "gNB"), PL represents the path loss [dB] measured by the terminal, a represents a weighting factor (preset value) that indicates a ratio of path loss compensation, $\Delta_{TF}(i)$ represents an offset [dB] dependent on the modulation and coding scheme (MCS) of the data to transmit for the subframe number i, and $f_c(i)$ represents a closed loop correction value for the subframe number i.

Herein, the method of computing the closed loop correction value Ni) is different depending on the TPC mode. An "Accumulated mode" and an "Absolute mode" are included among the possible TPC modes, and for each terminal, the mode to apply quasi-statically is set by RRC signaling.

As indicated in Formula (2), the Accumulated mode computes $f_c(i)$ by accumulating a correction value $\delta_{PUSCH}$ [dB] (hereinafter called the "TPC command correction value") indicated by past TPC commands (hereinafter called TPC command information). Note that in Formula (2), $K_{PUSCH}$ represents the timing at which the TPC command correction value is reflected.

$$f_c(i) = f_c(i-1) + \delta_{PUSCH}(i - K_{PUSCH}) \quad (2)$$

As indicated in Formula (3), the Absolute mode computes $f_c(i)$ by using the TPC command correction value directly, without accumulating past TPC command correction values.

$$f_c(i) = \delta_{PUSCH}(i - K_{PUSCH}) \quad (3)$$

The TPC command information indicating the TPC command correction value $\delta_{PUSCH}$ is included in the control information (downlink control information (DCI)), and is transmitted from the base station to the terminal using the physical downlink control channel (PDCCH). A TPC command correction value $\delta_{PUSCH,c}$ associated with the TPC command information (also simply referred to as "$\delta_{PUSCH}$") is defined as illustrated in FIG. 1, for example (see NPL 1).

Also, in LTE, in the case where the parameter $P_{o\_pusch}$ indicated in Formula (1) is set again during the Accumulated mode, the closed loop correction value is reset ($f_c(i)=0$ is set). In other words, in LTE, an indirect reset notification depending on setting the parameter again is stipulated.

On the other hand, in NR, the PUSCH transmission power formula indicated in Formula (4) is under consideration (see NPL 2, for example).

$$P_{pusch}(i) = \min\{Pc \quad \max(i), 10 \quad \log \quad 10(M_{pusch}(i)) + P_{o\_pusch}(j) + \alpha(j) \cdot PL(k)\Delta_{TF}(i)f_c(i,l)\} \quad (4)$$

In Formula (4), i represents a slot number (or mini-slot number), j represents an open loop parameter number, k represents a resource number of a reference signal (RS) for measuring the path loss, and l represents a closed loop process number.

Also, PL(k) represents the path loss [dB] measured by the terminal using the RS resource number k. In other words, the value of the path loss changes according to the beam (directional pattern) applied to the RS resource number k.

Also, $P_{o\_pusch}(j)$ and $\alpha(j)$ are independent parameter values for every open loop parameter number #j. For example, $P_{o\_pusch}(j)$ and (L(j)) are set to different values depending on properties such as the beam to apply to the PUSCH, the PUSCH waveform (cyclic prefix-orthogonal frequency-division multiplexing (CP-OFDM) or discrete Fourier transform-spread OFDM (DFT-S-OFDM)), the numerology to apply (such as the sub-carrier interval), and the service type (such as enhanced mobile broadband (eMBB) or ultra-reliable and low latency communications (URLLC)).

Also, $f_c(i, l)$ is the closed loop correction value of the closed loop process number l. For example, $f_c(i, l)$ has independent values depending on properties such as the beam to apply to the PUSCH, the waveform, the numerology, and the service type.

As above, in NR, the parameter to use in the computation of the transmission power of the PUSCH changes dynamically according to properties such as the beam to apply to the PUSCH, the waveform, the numerology, and the service type.

In such PUSCH transmission power control in NR, in a similar manner to the PUSCH transmission power control in LTE, the method of resetting the closed loop correction value $f_c(i, l)$ (that is, the method of setting $f_c(i, l)=0$) according to a change of parameters associated with properties such as the PUSCH beam and the waveform is inefficient, and may lead to degraded performance. Additionally, during the period after the reset of the closed loop correction value $f_c(i, l)$ until the transmission power control value converges on an optimal value, there is a possibility of degraded system performance because of a drop in desired signal power or an increase in interfering power.

For this reason, in NR, it is necessary to consider an explicit reset notification method for the closed loop correction value $f_c(i, l)$.

For example, it is conceivable to indicate the reset timing of the closed loop correction value $f_c(i, l)$ dynamically using DCI signaling by the base station. As another example, in an environment where the optimal value of the transmission power is not expected to change greatly, such as in the case of performing a beam switch in the same transmission and reception point (TRP, that is, a transmission and reception point connected to the base station by optical fiber or the like), the base station does not indicate a reset of the closed loop correction value $f_c(i, l)$ to the terminal. On the other hand, in an environment where there is a possibility that the optimal value of the transmission power value will change greatly, such as in the case of performing a beam switch between different TRPs, the base station indicates a reset of the closed loop correction value to the terminal.

FIG. 2 illustrates a reset flag for closed loop correction value reset information (DCI) as one example of a method of issuing an explicit notification of a reset of the closed loop correction value $f_c(i, 1)$. However, as illustrated in FIG. 2, if a reset flag of the closed loop correction value is newly added, the size of the DCI information simply increases by 1 bit, and overhead is increased.

In this way, an explicit reset notification method for the closed loop correction value in NR has not been investigated thoroughly. Accordingly, in one embodiment of the present disclosure, a method of appropriately issuing a notification regarding a reset of the closed loop correction value will be described.

Embodiment 1

[Overview of Communication System]

A communication system according to one embodiment of the present disclosure is provided with a terminal 100 and a base station 200.

FIG. 3 is a block diagram illustrating part of the configuration of the terminal 100 according to an embodiment of the present disclosure. In the terminal 100 illustrated in FIG. 3, a transmission power control unit 105 controls the transmission power of an uplink channel (for example, the PUSCH) by using transmission power control information (TPC command information) indicating one from among a plurality of candidate values, A wireless transmission unit 108 transmits the uplink channel with the above transmission power.

Figure 4:
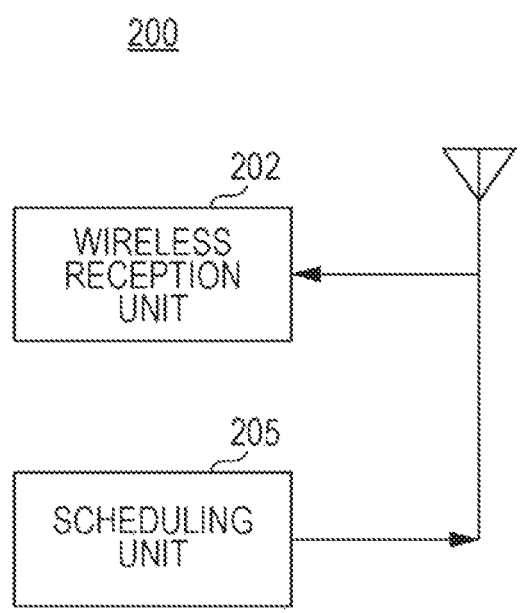
FIG. 4 illustrates a configuration of part of a base station according to Embodiment 1.

FIG. 4 is a block diagram illustrating part of the configuration of the base station 200 according to an embodiment of the present disclosure. In the base station 200 illustrated in FIG. 4, a scheduling unit 205 generates transmission power control information (TPC command information) indicating one from among a plurality of candidate values to be used in the transmission power control of an uplink channel (for example, the PUSCH), A wireless reception unit 202 receives the uplink channel transmitted with the above transmission power.

Herein, instruction information for resetting a control value (closed loop correction value) to be used in a closed loop control of the transmission power is associated with at least one value among the above plurality of candidate values,

[Configuration of Terminal]

Figure 5:
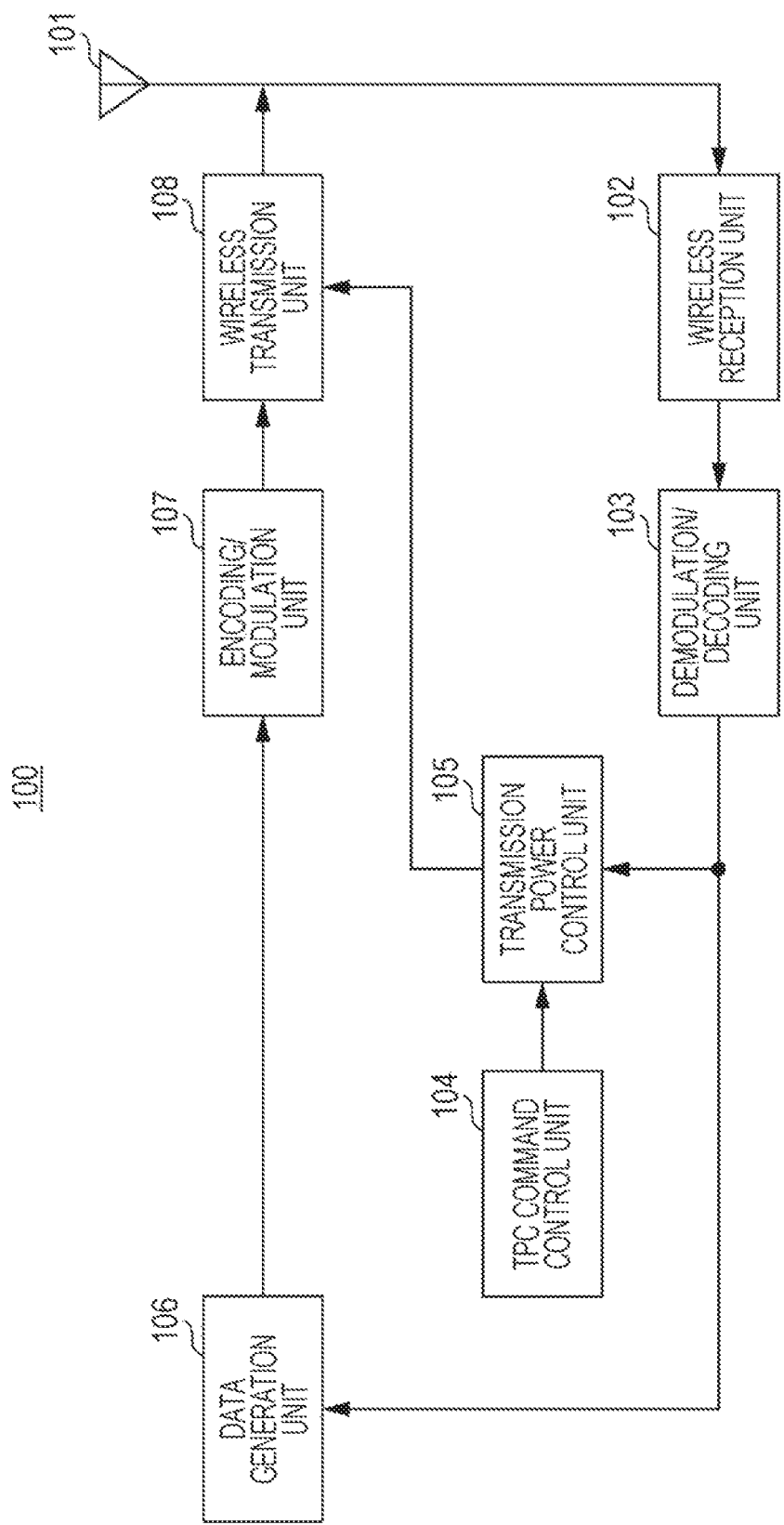
FIG. 5 illustrates a configuration of the terminal according to Embodiment 1.

FIG. 5 is a block diagram illustrating a configuration of the terminal 100 according to the present embodiment. The terminal 100 transmits the PUSCH to the base station 200 on the basis of an instruction from the base station 200.

In FIG. 5, the terminal 100 includes an antenna 101, a wireless reception unit 102, a demodulation/decoding unit 103, a TPC command control unit 104, the transmission power control unit 105, a data generation unit 106, an encoding/modulation unit 107, and the wireless transmission unit 108.

The wireless reception unit 102 performs reception processing such as downconversion and A/D conversion on a reception signal received through the antenna 101, and outputs the reception signal to the demodulation/decoding unit 103.

The demodulation/decoding unit 103 demodulates and decodes the reception signal input from the wireless reception unit 102, and from the decoding result, extracts PUSCH resource information and transmission power information transmitted from the base station 200 and addressed to the terminal 100. The demodulation/decoding unit 103 outputs the extracted information to the transmission power control unit 105 and the data generation unit 106.

The PUSCH resource information includes, for example, frequency resource information (such as the transmission bandwidth, the transmission band position (such as a PRB number or a block number)), for example, temporal resource information (such as a slot number and an orthogonal frequency-division multiplexing (OFDM) symbol number with which to transmit the PUSCH, for example), or the MCS for the PUSCH.

Also, in addition to TPC command information, the transmission power information includes information such as parameters used in the computation of the PUSCH transmission power indicated in Formula (4), for example.

Note that it is not necessary to report all of the PUSCH resource information or the transmission power information to the terminal 100 at the same time. For example, partial information from the transmission power information may also be reported to the terminal 100 as common cell information or as quasi-static notification information. Also, partial information from the transmission power information may be stipulated by specifications as common system information, and does not have to be reported from the base station 200 to the terminal 100.

The TPC command control unit 104 stores associations between the TPC command information and the TPC command correction value $\delta_{PUSCH}$ (for example, a table (hereinafter referred to as the "TPC command table")), and outputs the TPC command table to the transmission power control unit 105. The TPC command table may be reported from the base station 200 to the terminal 100 or stipulated by the specifications. Note that details about the method of setting the TPC command table will be described later.

The transmission power control unit 105 calculates the transmission power of the PUSCH on the basis of the PUSCH resource information and the transmission power information input from the demodulation/decoding unit 103. Specifically; the transmission power control unit 105 computes the parameters (such as Pcmax(i), $M_{pusch}(i)$, $P_{o\_pusch}(j)$, $\alpha(j)$, $PL(k)$, $\Delta_{TF}(i)$, and $f_c(i, 1)$) used in the transmission power formula (for example, Formula (4)).

Here, in the case where the TPC mode is the Accumulated mode, the transmission power control unit 105 computes the closed loop correction value $f_c(i, 1)$ for the slot number i by cumulatively adding the TPC command correction value $\delta_{PUSCH}$ corresponding to the currently reported TPC command information to the previous closed loop correction value $f_c(i-1, 1)$. At this point, the transmission power control unit 105 references the TPC command table output from the TPC command control unit 104 to decide the TPC command correction value $\delta_{PUSCH}$ corresponding to the TPC command information. Subsequently, the transmission power control unit 105 outputs information indicating the computed transmission power of the PUSCH to the wireless transmission unit 108.

The data generation unit 106 generates data to be transmitted by the terminal 100, on the basis of information input from the demodulation/decoding unit 103 (such as the MCS and information bit size indicated by the base station 200, for example). The data generation unit 106 outputs the generated transmission data to the encoding/modulation unit 107.

The encoding/modulation unit 107 encodes and modulates the transmission data input from the data generation unit 106, and outputs a modulated data signal to the wireless transmission unit 108.

The wireless transmission unit 108 performs D/A conversion and upconversion on the signal input from the encoding/modulation unit 107, and transmits the obtained wireless signal from the antenna 101 to the base station 200 with the transmission power input from the transmission power control unit 105.

[Configuration of Base Station]

Figure 6:
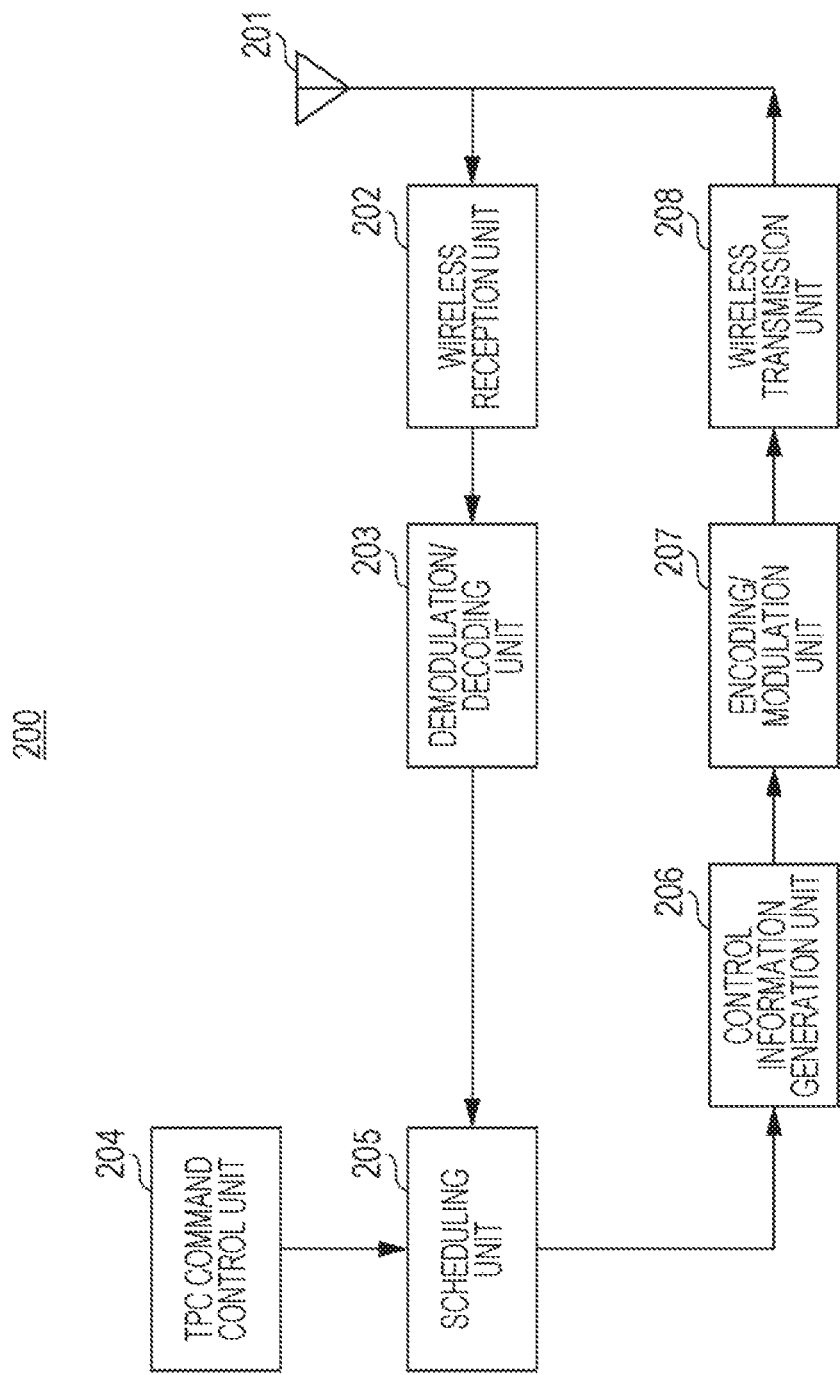
FIG. 6 illustrates a configuration of the base station according to Embodiment 1.

FIG. 6 is a block diagram illustrating a configuration of the base station 100 according to the present embodiment. The base station 200 performs scheduling (including transmission power control) of the PUSCH for the terminal 100.

In FIG. 6, the base station 200 includes an antenna 201, the wireless reception unit 202, a demodulation/decoding unit 203, a TPC command control unit 204, the scheduling unit 205, a control information generation unit 206, an encoding/modulation unit 207, and a wireless transmission unit 208.

The wireless reception unit 202 performs reception processing such as downconversion and A/D conversion on a signal received from the terminal 100 through the antenna 201, and outputs the reception signal to the demodulation/decoding unit 203.

The demodulation/decoding unit 203 demodulates and decodes the reception signal input from the wireless reception unit 202, and outputs a decoding result (that is, the presence or absence of reception error (successful reception or unsuccessful reception)) to the scheduling unit 205.

The TPC command control unit 204 stores a TPC command table indicating associations between the TPC command information and the TPC command correction value $\delta_{PUSCH}$, and outputs the TPC command table to the scheduling unit 205. The TPC command table stored by the TPC command control unit 204 is the same as the table stored by the terminal 100 (TPC command control unit 104). The TPC command table may be reported from the base station 200 to the terminal 100 or stipulated by specifications, and is uniquely associated between the terminal 100 and the base station 200. Note that details about the method of setting the TPC command table will be described later.

The scheduling unit 205 estimates quality information about each terminal (such as the received power or a reception signal-to-interference-and-noise ratio (SINR), for example) on the basis of a reference signal (not illustrated) transmitted by terminals (including the terminal 100) accommodated by the base station 200. Subsequently, on the basis of the estimated quality information, the scheduling unit 205 performs scheduling (such as radio resource allocation or transmission power control) of uplink channels, including the PUSCH, for the accommodated terminals. Also, in the case where the decoding result input from the demodulation/decoding unit 203 indicates unsuccessful reception, the scheduling unit 205 controls retransmission of the PUSCH for the affected terminal(s).

Also, the scheduling unit 205 references the TPC command table input from the TPC command control unit 204, and decides (generates) TPC command information on the basis of a difference value between a target received power and an actual received power of the PUSCH. Specifically, the scheduling unit 205 selects the TPC command correction value $\delta_{PUSCH}$ closest to the difference value between the target received power and the actual received power of the PUSCH from the TPC command table, and decides to use the corresponding TPC command information.

The scheduling unit 205 outputs the decided scheduling information (including the TPC command information) to the control information generation unit 206.

On the basis of an instruction from the scheduling unit 205, the control information generation unit 206 generates a control signal containing scheduling information (including TPC command information) to report to the terminal 100, and outputs the generated control signal to the encoding/modulation unit 207.

The encoding/modulation unit 207 encodes and modulates the control signal input from the control information generation unit 206, and outputs the modulated signal to the wireless transmission unit 208.

The wireless transmission unit 208 performs transmission processing such as D/A conversion, upconversion, and amplification on the signal input from the encoding/modulation unit 207, and transmits the wireless signal obtained by the transmission processing from the antenna 201 to the terminal 100.

[Operations of Terminal 100 and Base Station 200]

Operations in the terminal 100 and the base station 200 having the above configurations will be described in detail.

Figure 7:
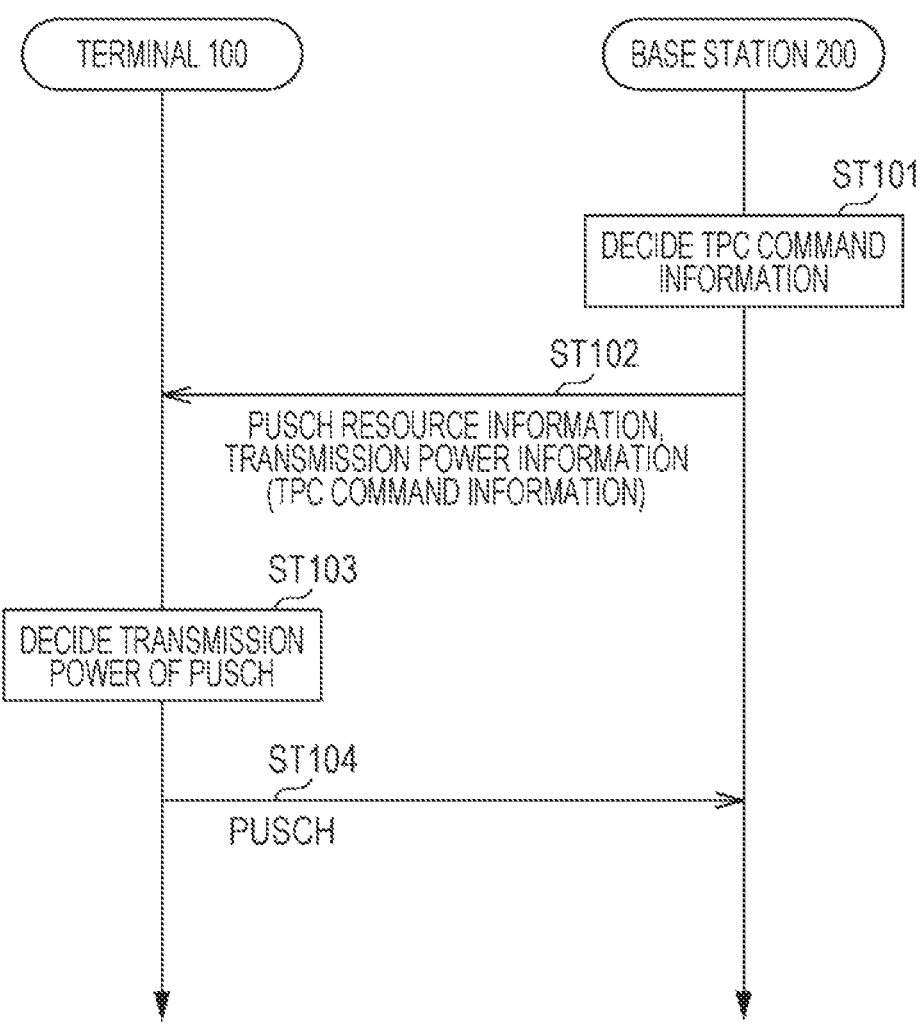
FIG. 7 illustrates exemplary operations of the terminal and the base station according to Embodiment 1.

FIG. 7 is a sequence diagram illustrating operations of the terminal 100 (FIG. 5) and the base station 200 (FIG. 6).

The base station 200 performs transmission power control with respect to the terminal 100, and decides the TPC command information to use for transmission power control in the terminal 100 (ST101). For example, the base station 200 references the TPC command table described later and selects TPC command information (a candidate value) corresponding to the TPC command correction value $\delta_{PUSCH}$ or instruction information for resetting the closed loop correction value $f_c(i, 1)$. Subsequently, the base station 200 transmits transmission power information including PUSCH resource information and the TPC command information decided in ST101 to the terminal 100 (ST102).

The terminal 100 uses the transmission power information (TPC command information) reported from the base station 200 in ST102 to decide the transmission power of the PUSCH (see Formula (4), for example) (ST103). Subsequently, the terminal 100 transmits the PUSCH to the base station 200 on the basis of the PUSCH resource information received in ST102 and the transmission power decided in ST103 (ST104). In other words, the base station 200 receives the PUSCH transmitted from the terminal 100 with a transmission power based on the TPC command information decided in ST101.

[Setting the TPC Command Table]

Next, methods of setting the TPC command table stored by the TPC command control unit 104 of the terminal 100 and the TPC command control unit 204 of the base station 200 will be described in detail.

Herein, at the timing of indicating a reset of the closed loop correction value $f_c(i, 1)$, transmission power control using a TPC command (a TPC command similar to LTE) is unnecessary. In other words, at the timing of indicating a reset of the closed loop correction value $f_c(i, 1)$, it is unnecessary to report the TPC command correction value $\delta_{PUSCH}$ by TPC command information.

Accordingly, in the present embodiment, instruction information for resetting the closed loop correction value $f_c(i, 1)$ is included in the TPC command information. In other words, instruction information for resetting the closed loop correction value $f_c(i, 1)$ is associated with at least one of the candidate values of the TPC command information. Also, among the candidate values of the TPC command information, TPC command correction values $\delta_{PUSCH}$ that correct the closed loop correction value $f_c(i, 1)$ are respectively associated with the candidate values other than the candidate value associated with the instruction information for resetting the closed loop correction value $f_c(i, 1)$.

In other words, in the case where a reset of the closed loop correction value $f_c(i, 1)$ is indicated by the TPC command information, the terminal 100 resets the closed loop correction value $f_c(i, 1)$. On the other hand, in the case where a transmission power control value (TPC command correction value $\delta_{PUSCH}$) is indicated by the TPC command information, the terminal 100 does not reset the closed loop correction value $f_c(i, 1)$.

Hereinafter, TPC command table Setting Examples 1 and 2 will be described.

Setting Example 1: Case of 2-Bit TPC Command Information

FIG. 8 illustrates one example of a TPC command table for the case where the TPC command information is 2 bits (that is, similar to the TPC command information of LTE) according to Setting Example 1.

In the TPC command table illustrated in FIG. 8, of the candidate values 0 to 3 of the TPC command information, "1" is associated with "Reset" of the closed loop correction value $f_c(i, 1)$. Also, in the TPC command table illustrated in FIG. 8, of the candidate values 0 to 3 of the TPC command information, the candidate values other than "1" (0, 2, 3) are respectively associated with each value (−1, 1, 3) of the TPC command correction value $\delta_{PUSCH}$.

In the case where the TPC command information reported from the base station 200 is "1", the terminal 100 (transmission power control unit 105) resets the closed loop correction value $f_c(i, 1)$. On the other hand, in the case where the TPC command information reported from the base station 200 is a value other than "1", the terminal 100 does not reset the closed loop correction value $f_c(i, 1)$, and instead cumulatively adds the TPC command correction value $\delta_{PUSCH}$ corresponding to the TPC command information to the previous closed loop correction value $f_c(i, 1)$ (performs the calculation of Formula (2)), and computes the transmission power of the PUSCH (performs the calculation of Formula (4)).

According to Setting Example 1, an instruction to reset the closed loop correction value $f_c(i, 1)$ can be issued from the base station 200 to the terminal 100 without increasing the size of the TPC command information compared to the TPC command information of LTE (see FIG. 1, for example).

Note that for the TPC command information "1" illustrated in FIG. 8, a control value that can be indicated in LTE (in the case of FIG. 8, the control value corresponding to the TPC command correction value $\delta_{PUSCH}$=0) cannot be indicated, and there is a possibility of a longer convergence time of the transmission power control. However, as illustrated in FIG. 8, by assigning the reset instruction in place of the TPC command correction value $\delta_{PUSCH}$=0 having the smallest absolute value from among the range of the TPC command correction value $\delta_{PUSCH}$ from −1 to 3, it is possible to prevent a limiting of the range of variation (correction range) of the closed loop correction value, and an increase in the convergence time of the transmission power control can be prevented.

Setting Example 2: Case of 3-Bit TPC Command Information

FIG. 9 illustrates one example of a TPC command table for the case where the TPC command information is 3 bits according to Setting Example 2. Note that the 3-bit TPC command information has the same amount of information as the case in which the closed loop correction value reset flag information (1 bit) illustrated in FIG. 2 is added to the LTE TPC command information (2 bits) illustrated in FIG. 1.

In the TPC command table illustrated in FIG. 9, of the candidate values 0 to 7 of the TPC command information, "0" is associated with "Reset" of the closed loop correction value $f_c(i, 1)$. Also, in the TPC command table illustrated in FIG. 9, of the candidate values 0 to 7 of the TPC command information, the candidate values other than "0" (1 to 7) are respectively associated with each value (−5, −3, −0, 1, 3, 5) of the TPC command correction value $\delta_{PUSCH}$.

In the case where the TPC command information reported from the base station 200 is "0", the terminal 100 (transmission power control unit 105) resets the closed loop correction value $f_c(i, 1)$. On the other hand, in the case where the TPC command information reported from the base station 200 is a value other than "0", the terminal 100 does not reset the closed loop correction value $f_c(i, 1)$, and instead cumulatively adds the TPC command correction value $\delta_{PUSCH}$ corresponding to the TPC command information to the previous closed loop correction value $f_c(i, 1)$ (performs the calculation of Formula (2)), and computes the transmission power of the PUSCH (performs the calculation of Formula (4)).

According to Setting Example 2, although the size of the TPC command information is increased by 1 bit compared to the TPC command information of LTE (see FIG. 1, for example), the TPC command information can be used to indicate both the TPC command correction value $\delta_{PUSCH}$ and the reset of the closed loop correction value $f_c(i, 1)$.

Additionally, for example, in the case of using the TPC command information (2 bits) of LTE illustrated in FIG. 1 and the closed loop correction value reset flag information (1 bit) illustrated in FIG. 2 (for a total of 3 bits) to report both the TPC command information and the reset of the closed loop correction value, it is possible to report four varieties of the TPC command correction value $\delta_{PUSCH}$ as well as the reset of the closed loop correction value. In contrast, with the TPC command information (3 bits) illustrated in FIG. 9, it is possible to report new TPC command correction values $\delta_{PUSCH}$ (in the case of FIG. 9, the values −5, −3, and 5) that do not exist in LTE (FIG. 1). In other words, in FIG. 9, the number of reportable TPC command correction values $\delta_{PUSCH}$ is increased without increasing the number of bits used (3 bits) compared to FIGS. 1 and 2. With this arrangement, it is possible to expand the correction range of the closed loop correction value $f_c(i, 1)$ by the TPC command correction value $\delta_{PUSCH}$ while also holding back an increase in control information overhead, improve the performance of transmission power control, and shorten the time to convergence on an optimal transmission power.

The above describes each of the Setting Examples 1 and 2.

In this way, in the present embodiment, information that indicates a reset of the closed loop correction value $f_c(i, 1)$ is included in the TPC command information reported from the base station 200 to the terminal 100. With this arrangement, in the present embodiment, the base station 200 can efficiently issue dynamic instructions to reset the closed loop correction value $f_c(i, 1)$ to the terminal 100. Also, in the present embodiment, the TPC command information can be used to add new TPC command correction values in addition to the TPC command information (TPC command correction values) of LTE. With this arrangement, according to the present embodiment, the performance of transmission power control can be improved while also holding back an increase in control information overhead.

As above, according to the present embodiment, a reset of the closed loop correction value can be reported appropriately, and transmission power control can be performed.

Embodiment 2

Because the terminal and the base station according to the present embodiment share the basic configuration of the terminal 100 and the base station 200 according to Embodiment 1, FIGS. 5 and 6 will be cited for the description.

In the present embodiment, the operations of the TPC command control unit 104 of the terminal 100 and the TPC command control unit 204 of the base station 200 (the setting of the TPC command table) are different from Embodiment 1.

FIG. 10 illustrates one example of the TPC command table according to the present embodiment.

The TPC command table illustrated in FIG. 10 includes TPC command correction values $\delta_{PUSCH}$ for each TPC command mode (Absolute mode and Accumulated mode). For example, in FIG. 10, each value (−1, 0, 1) of the TPC command correction value $\delta_{PUSCH}$ in Absolute mode is respectively associated with the candidate values 0 to 2 of the TPC command information. Also, in FIG. 10, each value (−3, −1, 0, 1, 3) of the TPC command correction value $\delta_{PUSCH}$ in Accumulated mode is respectively associated with the candidate values 3 to 7 of the TPC command information.

Furthermore, in FIG. 10, "Reset" of the closed loop correction value $f_c(i, 1)$ in Accumulated mode is associated with the candidate value "1" of the TPC command information that indicates the TPC command correction value $\delta_{PUSCH}$=0 in Absolute mode.

The terminal 100 (transmission power control unit 105) computes the transmission power of the PUSCH on the basis of control information (PUSCH resource information and transmission power information) reported from the base station 200. In a manner similar to Embodiment 1, the terminal 100 computes the parameters (for example, $f_c(i, 1)$) used in the transmission power formula (Formula (2) or (3)) on the basis of the control information.

For example, in Accumulated mode, in the case where the TPC command information reported from the base station 200 is a value from 3 to 7, the terminal 100 does not reset the closed loop correction value $f_c(i, 1)$, and instead cumulatively adds the TPC command correction value $\delta_{PUSCH}$ corresponding to the TPC command information to the previous closed loop correction value $f_c(i, 1)$, and thereby computes the closed loop correction value $f_c(i, 1)$ for the slot number i.

Also, in Accumulated mode, in the case where the TPC command information reported from the base station 200 is 1, the terminal 100 resets the closed loop correction value $f_c(i, 1)$.

On the other hand, in Absolute mode, in the case where the TPC command information reported from the base station 200 is a value from 0 to 2, the terminal 100 uses the TPC command correction value $\delta_{PUSCH}$ corresponding to the TPC command information as-is to compute the closed loop correction value $f_c(i, 1)$ for the slot number i.

In other words, in the TPC command table illustrated in FIG. 10, the TPC command information being equal to 1 corresponds to both the TPC command correction value $\delta_{PUSCH}$=0 dB in Absolute mode as well as the reset of the closed loop correction value in Accumulated mode.

Herein, resetting the closed loop correction value ($f_c(i, 1)$=0) in Accumulated mode corresponds to setting the TPC command correction value $\delta_{PUSCH}$=0 dB in Absolute mode. In other words, in FIG. 10, the reset of the closed loop correction value is associated with the same TPC command information as the TPC command correction value $\delta_{PUSCH}$ in Absolute mode that corresponds to the reset of the closed loop correction value (namely, $\delta_{PUSCH}$=0 dB).

In this way, in the present embodiment, a TPC command correction value corresponding to Accumulated mode and a TPC command correction value corresponding to Absolute mode are associated with each of the plurality of candidate values of the TPC command information. Also, instruction information for resetting the closed loop correction value is associated with a candidate value corresponding to one of the TPC command correction values in Absolute mode from among the plurality of candidate values of the TPC command information. Specifically, the same TPC command information is shared between the instruction to reset the closed loop correction value in Accumulated mode and the instruction to set the TPC command correction value $\delta_{PUSCH}$ to 0 dB (that is, $f_c(i, 1)$=0) in Absolute mode.

With this arrangement, although the size of the TPC command information is increased by 1 bit compared to the TPC command information of LTE (see FIG. 1, for example), the TPC command information can be used to indicate both the TPC command correction value $\delta_{PUSCH}$ and the reset of the closed loop correction value $f_c(i, 1)$.

Also, as illustrated in FIG. 10, regarding the instruction information for resetting the closed loop correction value $f_c(i, 1)$, the instruction information for resetting the closed loop correction value $f_c(i, 1)$ in Accumulated mode is reported using the same TPC command information as the TPC command correction value in Absolute mode. With this arrangement, in the present embodiment, all of the TPC command correction values in Accumulated mode can be indicated.

Furthermore, in the present embodiment, the TPC command information can be used to dynamically switch the TPC command mode (Absolute mode and Accumulated mode). For example, the terminal 100 may switch to Absolute mode in the case where the TPC command information is from 0 to 2 and switch to Accumulated mode in the case where the TPC command information is from 3 to 7.

Additionally, for example, in the case of using the TPC command information (2 bits) of LTE illustrated in FIG. 1 and the closed loop correction value reset flag information (1 bit) illustrated in FIG. 2 (for a total of 3 bits) to report both the TPC command information and the reset of the closed loop correction value, it is possible to report four varieties of the TPC command correction value $\delta_{PUSCH}$ as well as the reset of the closed loop correction value. In contrast, with the TPC command information (3 bits) illustrated in FIG. 10, it is possible to report a new TPC command correction value $\delta_{PUSCH}$ (in the case of FIG. 10, the value −3) that does not exist in LTE (FIG. 1). In other words, in FIG. 10, the number of reportable TPC command correction values $\delta_{PUSCH}$ is increased without increasing the number of bits used (3 bits) compared to FIGS. 1 and 2. With this arrangement, it is possible to expand the correction range of the closed loop correction value $f_c(i, 1)$ by the TPC command correction value $\delta_{PUSCH}$ while also holding back an increase in control information overhead, improve the performance of transmission power control, and shorten the time to convergence on an optimal transmission power.

Note that FIG. 10 illustrates case in which the instruction information for resetting the closed loop correction value in Accumulated mode is associated with the TPC command information (1) corresponding to the value with the smallest absolute value ($\delta_{PUSCH}=0$) among the TPC command correction values in Absolute mode. However, the instruction information for resetting the closed loop correction value in Accumulated mode is not limited to $\delta_{PUSCH}=0$ in Absolute mode, and an association with TPC command information (a candidate value) corresponding to a TPC command correction value in Absolute mode is sufficient. For example, in the case of performing transmission power control in Accumulated mode, if the TPC command information corresponding to the reset instruction information is received, it is sufficient for the terminal 100 to recognize the TPC command information as an instruction for resetting the closed loop correction value in Accumulated mode rather than as a TPC command correction value $\delta_{PUSCH}$ in Absolute mode.

Embodiment 3

In the present embodiment, a method of setting the TPC command table that accounts for beamforming applied in NR will be described.

In NR, a pair of a transmission beam and a reception beam when applying beamforming is called a "beam pair link (BPL)". In other words, the case in which either the transmission beam or the reception beam is changed results in a different BPL number. Also, to simplify control, it is conceivable for beamforming control to be performed in units called "BPL groups" for grouping multiple BPLs.

At this point, immediately after the BPL is switched for beamforming control, there is a possibility that the estimated path loss error, including the beam gain between the BPLs, or the interference level between the BPLs will be largely different compared to the BPL before the switch. For this reason, a problem occurs in which, immediately after a BPL switch, the transmission power control does not function correctly, and the transmission signal does not reach a targeted signal-to-interference-and-noise ratio (SINR) or the interference on other cell(s) increases.

Also, because the interference level of each beam fluctuates dynamically, simply setting quasi-static open loop control parameters (such as $\alpha(j)$ and $P_{o\_pusch}(j)$) for each BPL is inadequate as a correction of the quality error immediately after a BPL switch, Therefore, it is necessary to correct the quality error immediately after a BPL switch by closed loop control with the TPC command information (TPC command correction value) reported from the base station.

However, each beam gain is expected to have a difference of up to a maximum of 20 dB (see NPL 3, for example). Therefore, if the TPC command correction value has a step size similar to LTE, the convergence time for correcting the quality error immediately after a BPL switch becomes longer, and there is a possibility of degraded system performance because of a drop in desired signal power or an increase in interfering power in the period until the transmission power control value converges on an optimal value.

Accordingly, in the present embodiment, immediately after a BPL switch, a TPC command table having a different step size of the TPC command correction value than the step size of the TPC command correction value used normally (in periods other than a period immediately after a BPL switch) is used.

[Configuration of Terminal]

Figure 11:
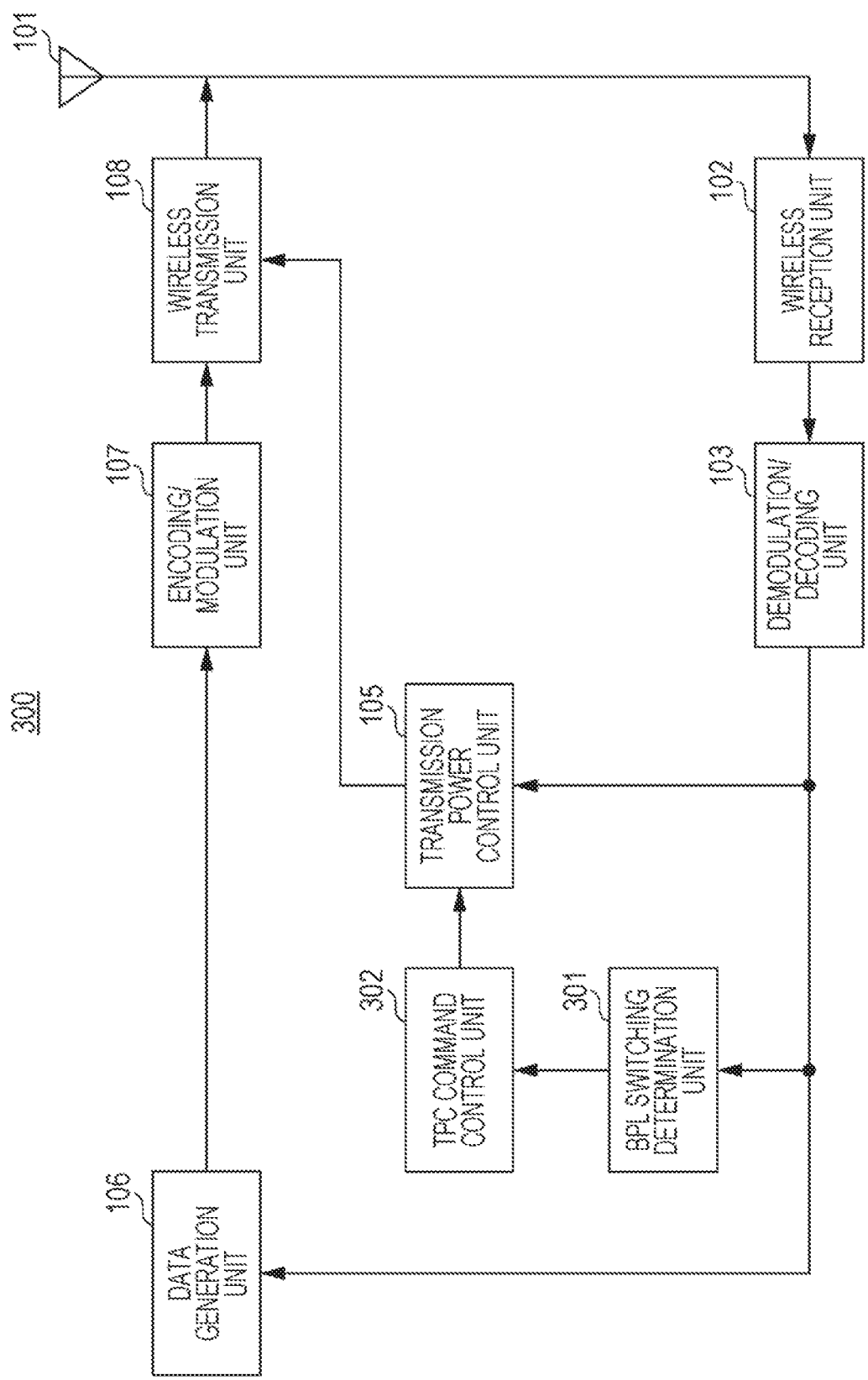
FIG. 11 illustrates a configuration of the terminal according to Embodiment 3.

FIG. 11 is a block diagram illustrating a configuration of a terminal 300 according to the present embodiment. Note that in FIG. 11, configuration elements similar to Embodiment 1 (FIG. 5) are denoted by the same signs, and description thereof will be omitted. Specifically, in FIG. 11, a BPL switching determination unit 301 has been added, and the operations of a TPC command control unit 302 are different from Embodiment 1.

The BPL switching determination unit 301 uses beam discrimination information included in the control information input from the demodulation/decoding unit 103 to determine whether or not a BPL switch has occurred. The beam discrimination information may be at least one of the SRS resource indicator (SRI), the CSI-RS resource indicator (CRI), or a beam indicator, for example. Note that the beam discrimination information is not limited to the SRI, the CRI, and the beam indicator, and is sufficiently a parameter making it possible to determine the presence or absence of a BPL switch.

The method of determining a BPL switch may be, for example, the BPL switching determination unit 301 storing the beam discrimination information previously indicated by a base station 400 (described later), comparing beam discrimination information newly reported by the base station 400 to the stored beam discrimination information, and determining that a BPL switch has occurred in the case where the two pieces of beam discrimination information indicate different values.

Note that the method of determining whether or not a BPL switch has occurred is not limited to a method that uses the beam discrimination information, and may also be a method that uses other information such as the transmission power parameter set (power control parameter set). Also, it is not necessary for the beam discrimination information to be reported using downlink control information (for example, DCI). Partial information about the beam discrimination information may also be reported to a terminal 300 as common cell information or as quasi-static notification information.

The BPL switching determination unit 301 outputs BPL switch information indicating whether or not a BPL switch has occurred to the TPC command control unit 302.

As the TPC command table indicating the association between the TPC command information and the TPC command correction value $\delta_{PUSCH}$, the TPC command control unit 302 stores a TPC command table to use immediately after a BPL switch (called the "post-BPL switch TPC command table"), and a TPC command table to use at times other than immediately after a BPL switch (called the "normal TPC command table"). In other words, in the TPC command table, each of the plurality of candidate values of the TPC command information is associated with two control values: a TPC command correction value to use normally, and a TPC command correction value to use after a BPL switch.

Note that details about the post-BPL switch TPC command table and the normal TPC command table will be described later.

In the case where the BPL switch information input from the BPL switching determination unit 301 indicates that a BPL switch has occurred, the TPC command control unit 302 outputs the information of the post-BPL switch TPC command table to the transmission power control unit 105. On the other hand, in the case where the BPL switch information input from the BPL switching determination unit 301 indicates that a BPL switch has not occurred, the TPC command control unit 302 outputs the information of the normal TPC command table to the transmission power control unit 105.

[Configuration of Base Station]

Figure 12:
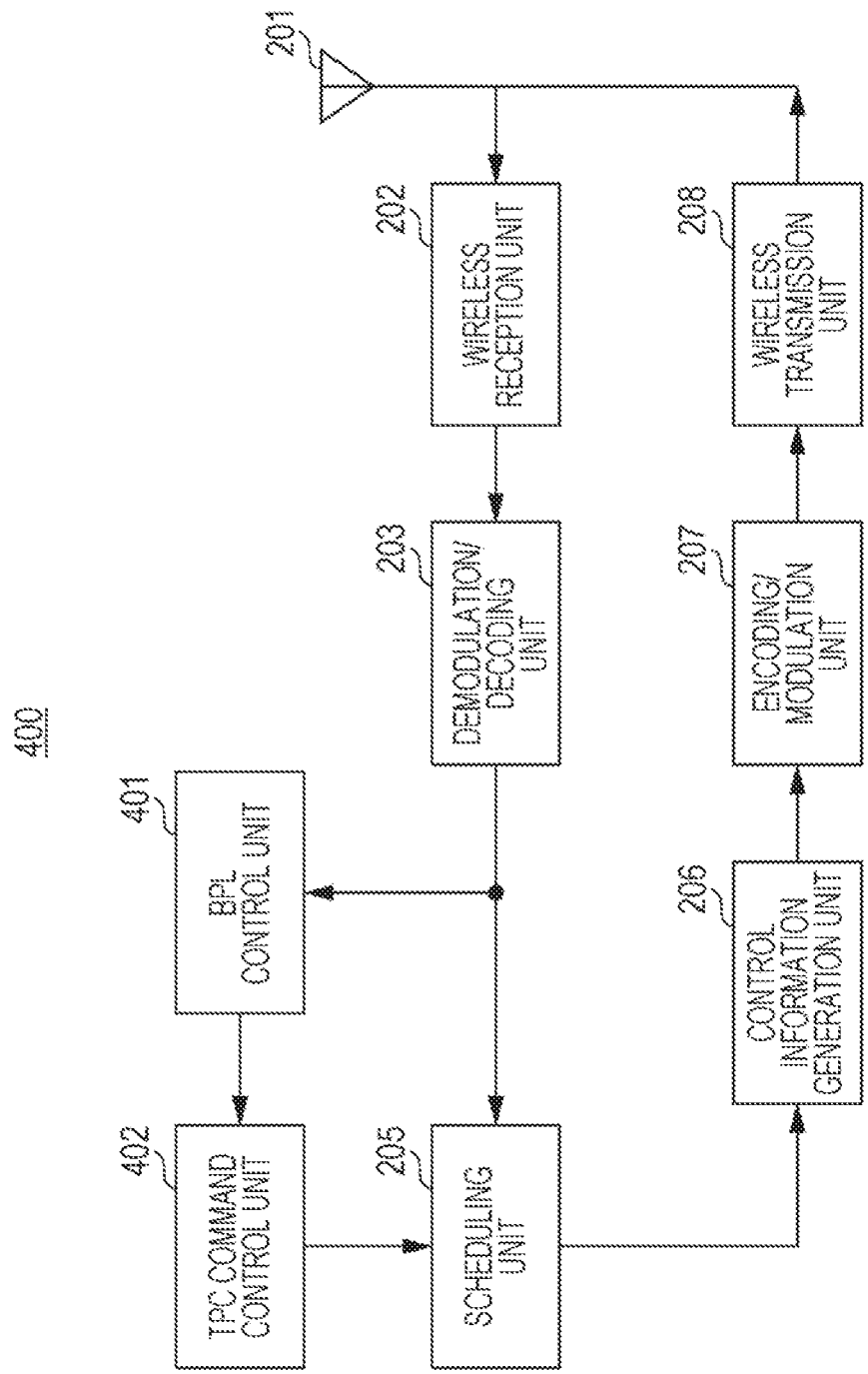
FIG. 12 illustrates a configuration of the base station according to Embodiment 3.

FIG. 12 is a block diagram illustrating a configuration of the base station 400 according to the present embodiment.

Note that in FIG. 12, configuration elements similar to Embodiment 1 (FIG. 6) are denoted by the same signs, and description thereof will be omitted. Specifically, in FIG. 12, a BPL control unit 401 has been added, and the operations of a TPC command control unit 402 are different from Embodiment 1.

The BPL control unit 401 measures quality information about each terminal on the basis of a reference signal (not illustrated) transmitted from each accommodated terminal and input from the demodulation/decoding unit 203. On the basis of the quality information, the BPL control unit 401 determines whether or not a BPL switch is necessary. For example, the BPL control unit 401 determines that a BPL switch is necessary in the case where the quality information is poor, and unnecessary in the case where the quality information is good. The BPL control unit 401 outputs BPL switch information indicating whether or not a BPL switch is necessary to the TPC command control unit 402.

The TPC command control unit 402 stores the post-BPL switch TPC command table and the normal TPC command table, in a similar manner as the terminal 300 (TPC command control unit 302). In the case where the BPL switch information input from the BPL control unit 401 indicates that a BPL switch is necessary, the TPC command control unit 402 outputs the information of the post-BPL switch TPC command table to the scheduling unit 205. On the other hand, in the case where the BPL switch information input from the BPL control unit 401 indicates that a BPL switch is unnecessary, the TPC command control unit 402 outputs the information of the normal TPC command table to the scheduling unit 205.

Next, the transmission power control (method of setting the TPC command table) in the terminal 300 and the base station 400 will be described in detail.

Figures 13, 14:
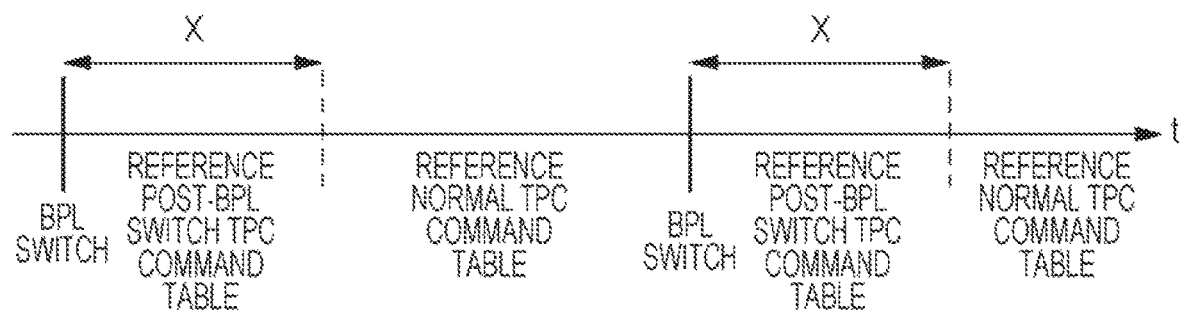
FIG. 13 illustrates one example of TPC command table switching according to Embodiment 3.
FIG. 14 illustrates one example of a post-BPL switch TPC command table according to Embodiment 3.

For example, as illustrated in FIG. 13, the terminal 300 (TPC command control unit 302) and the base station 400 (TPC command control unit 402) count the number of elapsed slots (or the elapsed time) since the timing when the BPL switch occurred, and determine whether or not the number of elapsed slots exceeds a threshold value X. Subsequently, the terminal 300 and the base station 400 switch the TPC command table to use according to the determination result. Specifically, the terminal 300 and the base station 400 use the post-BPL switch TPC command table (see FIG. 14, for example) in the case where the number of elapsed slots is the threshold value X or less, and use the normal TPC command table (see FIG. 9, for example) in the case where the number of elapsed slots is greater than the threshold value X.

Note that the threshold value X may be defined in a specification document or reported from the base station 400 to the terminal 300 by higher-layer signaling or the like. Also, the elapsed time is not limited to the number of slots, and may also be treated as the number of times the PUSCH or the like is transmitted.

Herein, in the normal TPC command table illustrated in FIG. 9, the range of the TPC command correction value $\delta_{PUSCH}$ reported by the TPC command information (0 to 7) is from −5 to 5 [dB], whereas in the post-BPL switch TPC command table illustrated in FIG. 14, the range of the TPC command correction value $\delta_{PUSCH}$ reported by the TPC command information (0 to 7) is from −7 to 7 [dB].

In other words, in the TPC command tables (for example, FIGS. 9 and 14) according to the present embodiment, TPC command correction values used normally and TPC command correction values used after a BPL switch, which have a larger step size than the TPC command correction values used normally, are associated with every candidate value (1 to 7 in FIGS. 9 and 14) other than a candidate value (0 in FIGS. 9 and 14) associated with instruction information for indicating a reset of the closed loop correction value. Also, the step size (see FIG. 14) of the TPC command correction values used after a BPL switch is set to a larger size than the step size of the TPC command correction values used normally.

With this arrangement, in the terminal 300 and the base station 400, immediately after a BPL switch, transmission power control using TPC command correction values $\delta_{PUSCH}$ with a large step size compared to normal is performed. Therefore, by increasing the step size for correcting the quality error immediately after a BPL switch when there is a high probability of increased path loss estimation error, including the beam gain between BPLs, or interference between BPLs, the terminal 300 and the base station 400 can shorten the time until the transmission power control value converges on an optimal value.

Therefore, according to the present embodiment, even in the case where a BPL switch occurs, degraded system performance caused by a drop in the desired signal power or an increase in interfering power can be prevented.

Embodiment 4

In the present embodiment, similar to Embodiment 3, a method of setting the TPC command table that accounts for beamforming applied in NR will be described.

In NR, it is conceivable that the beamforming control that can be applied will be different for every terminal, depending on the capability (antenna configuration, processing power) of the terminal. For example, a terminal having low capability with respect to beam control (for example, a terminal with few antennas) has a wider beam width than a terminal having high capability with respect to beam control (for example, a terminal with many antennas). In this case, fluctuations in the beam gain due to movement of the terminal or the influence of an obstruction near the terminal are conceivably different depending on the beam width set in the terminal. Specifically, there is a possibility that terminals with narrower beam widths will have increased fluctuation in the beam gain.

Also, although fluctuations in the beam gain are correctable by closed loop control, if terminals having different capabilities regarding beam control use the same TPC command table, the precision by which the closed loop correction value is made to follow the optimal value will be different for every terminal. For this reason, depending on the terminal, there is a possibility of degraded system performance caused by a drop in the desired signal power or an increase in interfering power.

Accordingly, the present embodiment describes a case of switching the TPC command table to use according to the capability of the terminal.

[Configuration of Terminal]

Figure 15:
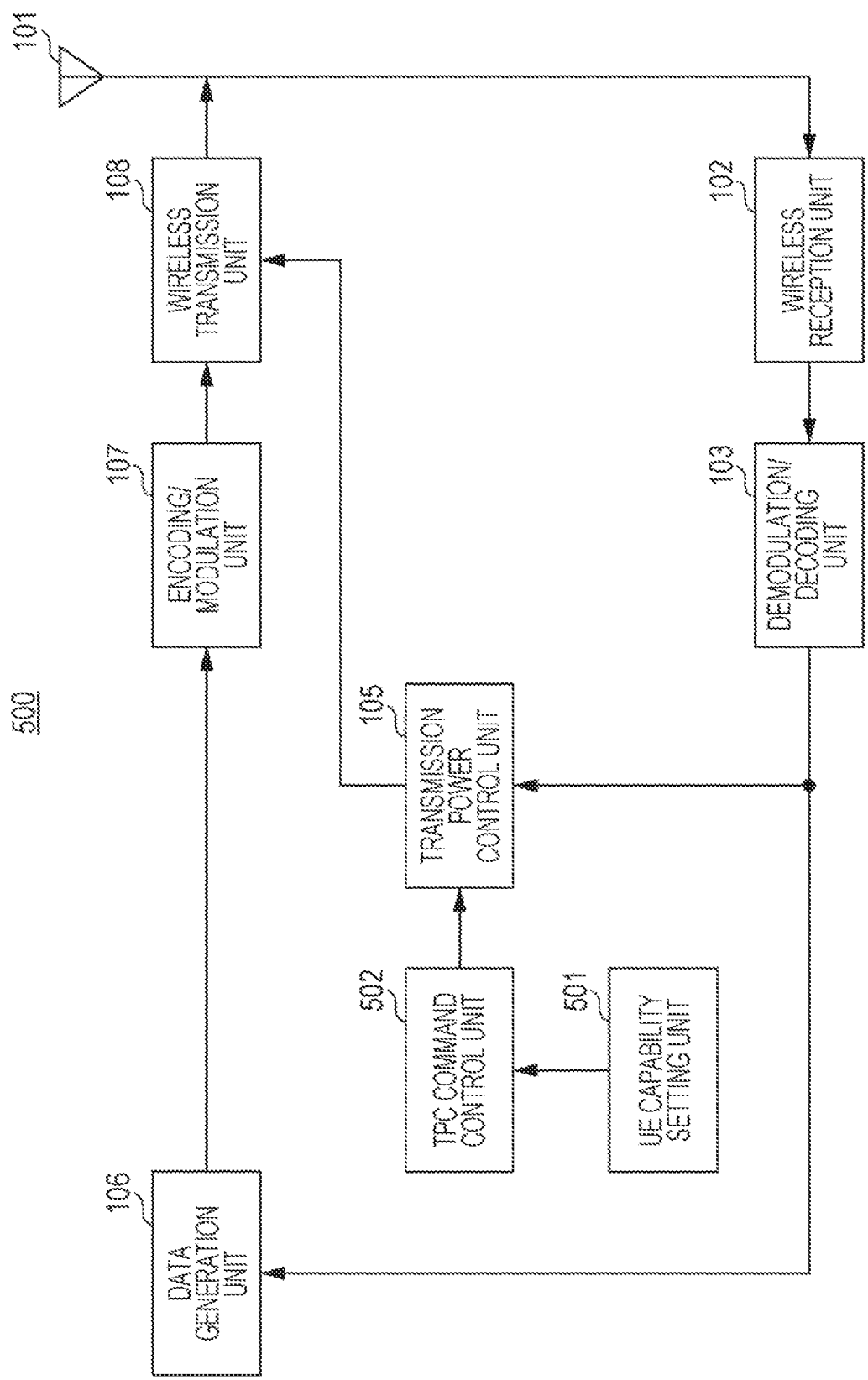
FIG. 15 illustrates a configuration of the terminal according to Embodiment 4.

FIG. 15 is a block diagram illustrating a configuration of a terminal 500 according to the present embodiment. Note that in FIG. 15, configuration elements similar to Embodiment 1 (FIG. 5) are denoted by the same signs, and description thereof will be omitted. Specifically, in FIG. 15, a UE capability setting unit 501 has been added, and the operations of a TPC command control unit 502 are different from Embodiment 1.

The UE capability setting unit 501 stores UE capability information stipulated by specifications according to the antenna configuration, processing power, and the like of the terminal 500. The UE capability setting unit 501 outputs UE capability information to the TPC command control unit 502.

On the basis of the UE capability information (capability information related to beam control (for example, beam width information)) input from the UE capability setting unit 501, the TPC command control unit 502 switches the TPC command table indicating associations between the TPC command information and the TPC command correction value $\delta_{PUSCH}$.

[Configuration of Base Station]

Figure 16:
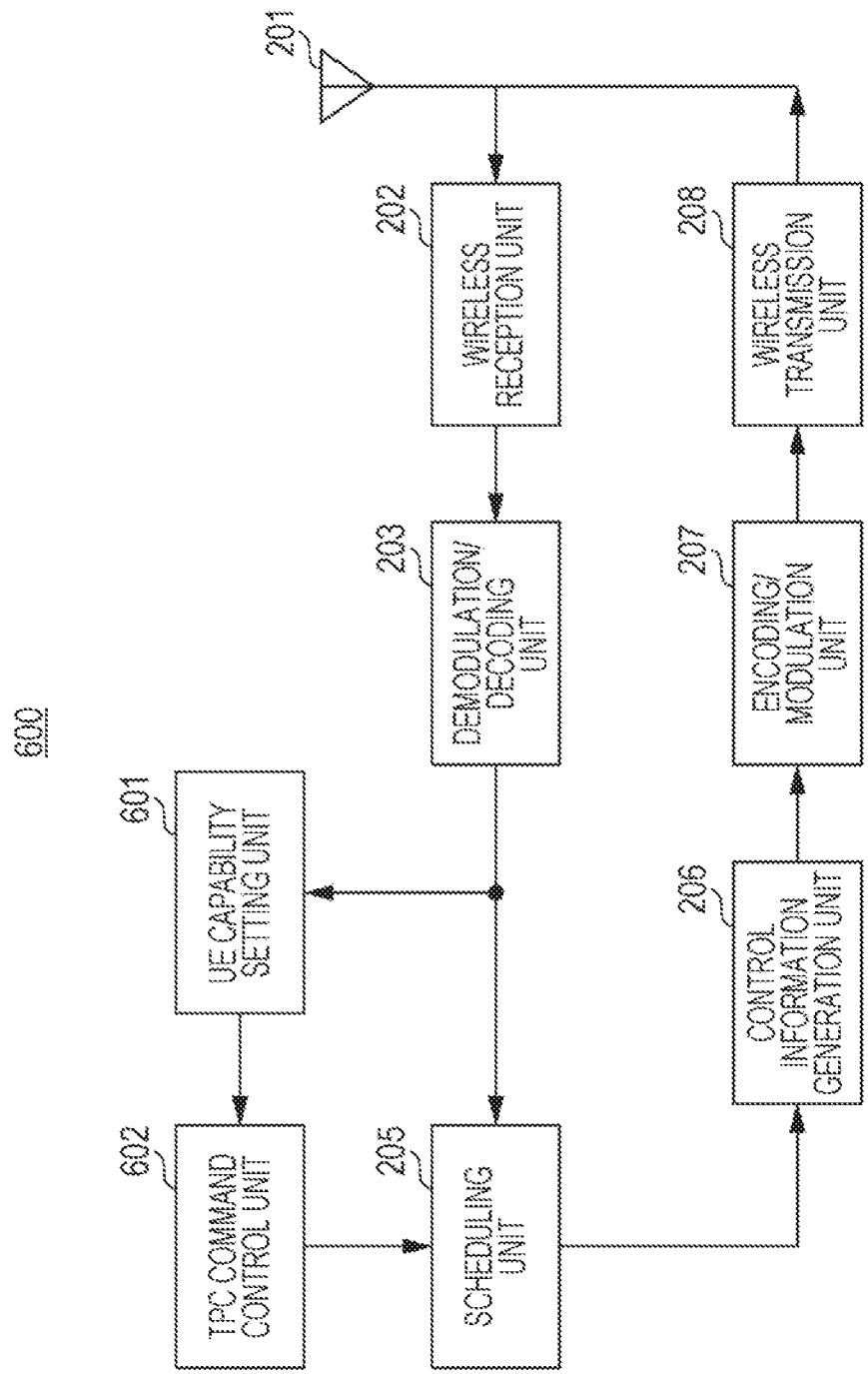
FIG. 16 illustrates a configuration of the base station according to Embodiment 4.

FIG. 16 is a block diagram illustrating a configuration of a base station 600 according to the present embodiment. Note that in FIG. 16, configuration elements similar to Embodiment 1 (FIG. 6) are denoted by the same signs, and description thereof will be omitted. Specifically, in FIG. 16, a UE capability setting unit 601 has been added, and the operations of a TPC command control unit 602 are different from Embodiment 1.

The UE capability setting unit 601 outputs UE capability reported by an accommodated terminal and input from the demodulation/decoding unit 203 to the TPC command control unit 602.

In a similar manner as the terminal 500 (TPC command control unit 502), the TPC command control unit 602 switches the TPC command table to use in the transmission power control for the terminal 500 on the basis of the UE capability input from the UE capability setting unit 601.

Next, the transmission power control (method of setting the TPC command table) in the terminal 500 and the base station 600 will be described in detail.

FIG. 17 illustrates one example of a TPC command table set in the terminal 500 that performs beamforming control with a narrow beam width, while FIG. 18 illustrates one example of a TPC command table set in the terminal 500 that performs beamforming control with a wide beam width.

In the TPC command table illustrated in FIG. 17, the range of the TPC command correction value $\delta_{PUSCH}$ reported by the TPC command information (0 to 7) is from −6 to 6 [dB], whereas in the TPC command table illustrated in FIG. 18, the range of the TPC command correction value $\delta_{PUSCH}$ reported by the TPC command information (0 to 7) is from −3 to 3 [dB].

In other words, in the TPC command tables (FIGS. 17 and 18) according to the present embodiment, TPC command correction values set in a terminal 500 that uses a narrow beam width and TPC command correction values set in a terminal 500 that uses a wide beam width are associated with every candidate value (1 to 7 in FIGS. 17 and 18) other than a candidate value (0 in FIGS. 17 and 18) associated with instruction information for indicating a reset of the closed loop correction value. Also, the step size (FIG. 17) of the TPC command correction values set in the terminal 500 that uses a narrow beam width is set to a larger size than the step size of the TPC command correction values set in the terminal 500 that uses a wide beam width.

With this arrangement, in the terminal 500 and the base station 600, for a terminal 500 having a narrow beam width, transmission power control is performed using TPC command correction values $\delta_{PUSCH}$ with a larger step size compared to a terminal 500 having a wide beam width. Therefore, by increasing the step size for correcting the quality error for a terminal 500 having a high probability of increased fluctuations in the beam gain, the terminal 500 and the base station 600 can shorten the time until the transmission power control value converges on an optimal value.

On the other hand, in the terminal 500 and the base station 600, for a terminal 500 having a wide beam width, transmission power control is performed using TPC command correction values $\delta_{PUSCH}$ with a smaller step size compared to a terminal 500 having a narrow beam width. In other words, the terminal 500 and the base station 600 can avoid unnecessarily increasing the step size for correcting the quality error for a terminal 500 having relatively small fluctuations in the beam gain, and accurately set the transmission power control value to an optimal value.

In this way, in the present embodiment, the terminal 500 and the base station 600 can perform transmission power control by appropriately selecting the TPC command correction value $\delta_{PUSCH}$ on the basis of the UE capability information for each terminal 500. With this arrangement, according to the present embodiment, transmission power control can be performed appropriately for every terminal 500 having different capabilities regarding beam control, and degraded system performance caused by a drop in the desired signal power or an increase in interfering power can be prevented.

Note that the information serving as the basis for switching the TPC command table is not limited to the beam width, and information related to the beam width is sufficient.

For example, the TPC command table may be switched according to the number of beams set in the terminal 500. As more beams are set in the terminal 500, the beam width conceivably becomes narrower.

In addition, the TPC command table may be switched according to the reference signal class used to calculate the path loss used in the computation of the transmission power. If the reference signal is the CSI-RS, the applied beam width is conceivably narrower than the synchronization signal (SS) block.

Furthermore, the TPC command table may also be switched according to the transmission carrier frequency. For example, for the millimeter-wave band in which the carrier frequency is 24 GHz or higher, there are conceivably more antennas and the applied beam widths are conceivably narrower compared to carrier frequencies lower than 24 GHz.

In this way, effects similar to the present embodiment can be obtained even in cases where the TPC command table is switched according to the number of beams, the reference signal class used for path loss estimation, or the transmission carrier frequency.

The above describes exemplary embodiments of the present disclosure.

Note that a "beam" described above may be defined as follows.

(1) A transmission directional pattern (including analog beamforming) of the terminal 100, 300, or 500

(2) A reception directional pattern (including analog beamforming) of the base station 200, 400, or 600

(3) A combination (BPL) of a transmission directional pattern of the terminal 100, 300, or 500 and a reception directional pattern of the base station 200, 400, or 600

(4) The preceding matrix indicator (PMI)

(5) The codebook number

Also, the foregoing embodiments describe transmission power control of the PUSCH, but the target of the transmission power control is not limited to the PUSCH, and the present disclosure is applicable to the transmission power control of an uplink channel that uses the closed loop correction value. For example, the present disclosure is also applicable to transmission power control for the SRS or the PUCCH instead of the PUSCH, and similar effects can be obtained.

Also, the TPC command tables illustrated in FIGS. 8 to 10, 14, 17, and 18 are merely examples, and the number of candidate values (number of bits) of the TPC command information or the TPC command correction values associated with the TPC command information is not limited to the values illustrated in FIGS. 8 to 10, 14, 17, and 18.

Also, the explicit reset notification illustrated in the foregoing embodiments may also be combined with an indirect reset notification depending on setting the transmission power control parameter(s) again, in a manner similar to LTE. In other words, the closed loop correction value is reset in each of the case where the TPC command information included in the DCI contains instruction information for resetting the closed loop correction value and the case where the transmission power control parameter(s) is set again by a higher-layer notification from the base station. With this arrangement, because it is not necessary to issue a reset notification by the DCI after the parameter(s) is set again, the control information overhead can be reduced.

The present disclosure is realizable by software, by hardware, or by software in cooperation with hardware. Each function block used in the description of the foregoing embodiments may be realized in whole or in part as an integrated circuit, that is, an LSI circuit. Each process described in the foregoing embodiments may be controlled in whole or in part, by a single LSI circuit or a combination of LSI circuits. An LSI circuit may include individual chips, or may include a single chip that contains some or all of the function blocks. An LSI circuit may also be provided with data inputs and outputs. LSI may also be referred to as an IC, system LSI, super LSI, or ultra LSI, depending on the degree of integration. The circuit integration methodology is not limited to LSI, and may be also be achieved with one or more special-purpose circuits, general-purpose processors, or special-purpose processors. Also, a field-programmable gate array (FPGA) capable of being programmed after fabrication of an LSI chip, or a reconfigurable processor whose circuit cell connections and settings inside an LSI chip may be reconfigured, may also be used. The present disclosure may be realized as digital processing or analog processing. Furthermore, if circuit integration technology that may be substituted for LSI appears as a result of progress in semiconductor technology or another derived technology, obviously the new technology may be used to integrate the function blocks. Biotechnology applications and the like are also a possibility.

A terminal of the present disclosure is provided with a circuit that controls a transmission power of an uplink channel by using transmission power control information indicating one value from among a plurality of candidate values; and a transmitter that transmits the uplink channel with the transmission power, wherein instruction information for resetting a control value to use in a closed loop control of the transmission power is associated with at least one value among the plurality of candidate values.

In the terminal of the present disclosure, correction values that correct the control value are respectively associated with each candidate value other than the at least one candidate value associated with the instruction information among the plurality of candidate values.

In the terminal of the present disclosure, first correction value and a second correction value having a larger step size than the first correction value are associated with each candidate value other than the at least one candidate value associated with the instruction information.

In the terminal of the present disclosure, the first correction value is used within a predetermined period from a switch of beams set in the terminal.

In the terminal of the present disclosure, the first correction value is used in a case where a narrow beam width is set in the terminal, and the second correction value is used in a case where a wide beam width is set in the terminal.

In the terminal of the present disclosure, a correction value for correcting the control value is associated with each of the plurality of candidate values, the correction value is one of either first correction values corresponding to a first mode that computes the control value by accumulating past values of the correction value, or second correction values corresponding to a second mode that computes the control value without accumulating past values of the correction value, and the instruction information is associated with the candidate value corresponding to one of the second correction values.

In the terminal of the present disclosure, the instruction information is associated with the candidate value corresponding to a value having the smallest absolute value among the second correction values.

A base station of the present disclosure is provided with a circuit that generates transmission power control information indicating one value from among a plurality of candidate values used to control a transmission power of an uplink channel; and a receiver that receives the uplink channel transmitted with the transmission power, wherein instruction information for resetting a control value to use in a closed loop control of the transmission power is associated with at least one value among the plurality of candidate values.

A transmission method of the present disclosure includes: controlling a transmission power of an uplink channel by using transmission power control information indicating one value from among a plurality of candidate values; and transmitting the uplink channel with the transmission power, wherein instruction information for resetting a control value to use in a closed loop control of the transmission power is associated with at least one value among the plurality of candidate values.

A reception method of the present disclosure includes: generating transmission power control information indicating one value from among a plurality of candidate values used to control a transmission power of an uplink channel; and receiving the uplink channel transmitted with the transmission power, wherein instruction information for resetting a control value to use in a closed loop control of the transmission power is associated with at least one value among the plurality of candidate values.

INDUSTRIAL APPLICABILITY

An embodiment of the present disclosure is useful in a mobile communication system.

REFERENCE SIGNS LIST

100, 300, 500 terminal
101, 201 antenna
102, 202 wireless reception unit
103, 203 demodulation/decoding unit
104, 204, 302, 402, 502, 602 TPC command control unit
105 transmission power control unit
106 data generation unit
107, 207 encoding/modulation unit 108, 208 wireless transmission unit
200, 400, 600 base station
205 scheduling unit
206 control information generation unit
301 BPL switching determination unit
401 BPL control unit
501, 601 UE capability setting unit

The invention claimed is:

1. A terminal comprising:
circuitry, which, in operation, stores a plurality of candidate values, receives transmission power control information indicating one candidate value from among the plurality of candidate values, and controls a transmission power of an uplink channel by using the transmission power control information; and
a transmitter, which, in operation, transmits the uplink channel with the transmission power, wherein
instruction information for resetting a control value to use in a closed loop control of the transmission power is associated with a candidate value that has the smallest absolute value among the plurality of candidate values, and
a correction value that corrects the control value is associated with at least one candidate value among the plurality of candidate values.

2. The terminal according to claim 1, wherein
correction values that correct the control value are respectively associated with candidate values of the plurality of candidate values other than the candidate value associated with the instruction information.

3. The terminal according to claim 2, wherein
a first correction value and a second correction value having a larger step size than the first correction value are associated with each of the plurality of candidate values other than the candidate value associated with the instruction information.

4. The terminal according to claim 3, wherein
the first correction value is used within a predetermined period from a switch of beams set in the terminal.

5. The terminal according to claim 3, wherein
the first correction value is used in a case where a narrow beam width is set in the terminal, and the second correction value is used in a case where a wide beam width is set in the terminal.

6. The terminal according to claim 1, wherein
correction values that correct the control value are respectively associated with the plurality of candidate values,
each of the correction values is one of either a first correction value corresponding to a first mode that computes the control value by accumulating past values of the correction value, or a second correction value corresponding to a second mode that computes the control value without accumulating past values of the correction value, and
the instruction information is associated with a candidate value corresponding to the second correction value.

7. The terminal according to claim 6, wherein
the instruction information is associated with a candidate value corresponding to a value having the smallest absolute value among second correction values.

8. A transmission method comprising:
storing a plurality of candidate values;
receiving transmission power control information that indicates one candidate value from among the plurality of candidate values;
controlling a transmission power of an uplink channel by using the transmission power control information; and
transmitting the uplink channel with the transmission power, wherein
instruction information for resetting a control value to use in a closed loop control of the transmission power is associated with a candidate value that has the smallest absolute value among the plurality of candidate values, and
a correction value that corrects the control value is associated with at least one candidate value among the plurality of candidate values.

* * * * *